May 12, 1942.  L. S. GUARDIOLA  2,283,056
PISTON PACKING
Filed May 13, 1940  2 Sheets-Sheet 1
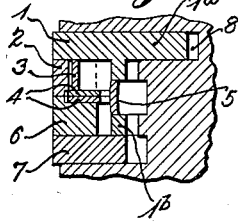
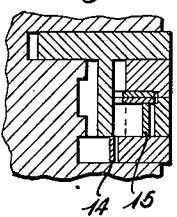
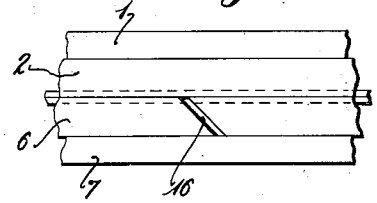
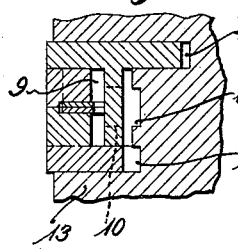
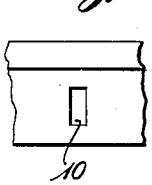
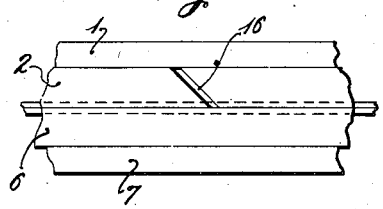
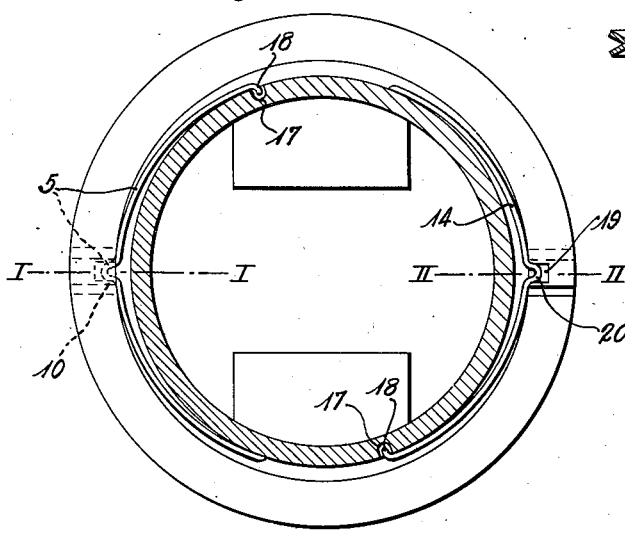
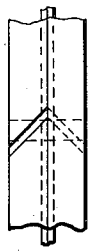
Inventor
Louis S. Guardiola
By Stevens and Davis
Attorneys May 12, 1942.   L. S. GUARDIOLA   2,283,056
PISTON PACKING
Filed May 13, 1940   2 Sheets-Sheet 2

Inventor
Louis S. Guardiola
By Stevens and Davis
Attorneys

Patented May 12, 1942

2,283,056

UNITED STATES PATENT OFFICE 2,283,056

PISTON PACKING

Louis Sobrino Guardiola, Brussels, Belgium

Application May 13, 1940, Serial No. 334,936
In Germany May 13, 1939

4 Claims. (Cl. 309—7)

My invention relates to improvements in piston packing arrangements.

In the construction of engines for motor vehicles a degree of perfection has been attained which may be regarded as remarkable per se. In spite of the increased strength of the materials used, however, the very essential part of the engine, viz. the piston, still shows an important disadvantage, with the result that the power output of the combustion gases is prejudiced.

In the engine of a motor vehicle of good construction the compression is always found to slacken after the vehicle has been driven through about 30,000–35,000 km., although the engine is still in a good condition in every other respect.

The loss of compression results in: (1) a noticeable drop of power; (2) an increase of lubricating oil consumption; and (3) an increase of specific gasoline consumption. In most cases this will involve a complete inspection of the engine and, even where no rectification of the cylinder block is required, it is necessary to change the pistons, or at least the piston rings, if it is desired that the engine yield a satisfactory power output for a further mileage.

In this connection it should be noticed that loss of compression is already initiated after the vehicle has been driven through the first 5000 km., while, at 35,000 km. such loss reaches a value which is intolerable from both the economical and the practical stand-point. Of course, the above mileages are given merely by way of example, since there are engines which, for various reasons, would run a greater number of kilometers, without the loss of compression involving the occurrence of the critical loss of power as rapidly as in the above example; the difference, however, is not very great.

In aeronautics, it is necessary to bring every engine to the repair shop after 350 hours of effective flight, in order to inspect the cylinder block and to change the pistons and the piston rings.

Briefly speaking, all of the aforesaid drawbacks originate from the fact that the cylinder bore becomes noncircular and that, in addition, the upper portion of the bore grows more or less conical. Moreover, the piston rings lose parts of their packing capacity owing to their wear, and, due to their distortion, do not fit correctly in the piston ring grooves.

Furthermore, due to the wear on the piston ring surface, the piston ring slit grows progressively larger, which facilitates the leakage of the gases, thus causing a decrease of the engine power with the above mentioned consequences.

To do away with these drawbacks, my invention relates to the provision, in a piston ring groove, of two unsplit rings one of angle section and the other of flat section, the said unsplit rings embracing two split piston rings and cooperating each with the adjacent piston ring, the slits in the said piston rings being diametrically opposed and the slit region of the piston rings being covered by the unsplit rings.

Tests have shown that a normal 8 cylinder V-type Ford engine yields, after 200,000 km. driving, the same power as during the first 1,000 km., provided the compression is constantly maintained. Under the same conditions, 1,000 to 1,300 effective working hours have been obtained with aircraft engines. In both instances it has been impossible to discern whether the limit, above which the engine provided with the piston packing according to my invention begins to show symptoms of loss of compression, was reached.

The improved structure according to my invention has regard to all the kinematic conditions to which the piston packing is subjected. Moreover, the thermal function that the packing has to assume as a heat abstractor, has also been taken into consideration.

Various embodiments of the improved arrangement are illustrated by way of example in the accompanying drawings, in which:

Fig. 1 is a cross section, to an enlarged scale, through a piston ring packing arrangement on line I—I of Fig. 8;

Fig. 2 is a cross section on line II—II of Fig. 8;

Fig. 3 is an elevation of the slit region of a piston ring;

Fig. 4 is a cross section similar to Fig. 1;

Fig. 5 is a fragmentary view of an unsplit ring;

Fig. 6 is an elevation of the slit region of the second piston ring;

Fig. 7 is a fragmentary view of two elastic washers;

Fig. 8 is a cross section through the piston at the level of the piston ring groove;

Fig. 9 is a cross section through two piston rings forced asunder by resilient washers;

Fig. 10 is an elevation of the slit region of the piston rings shown in Fig. 9.

Figure 11:
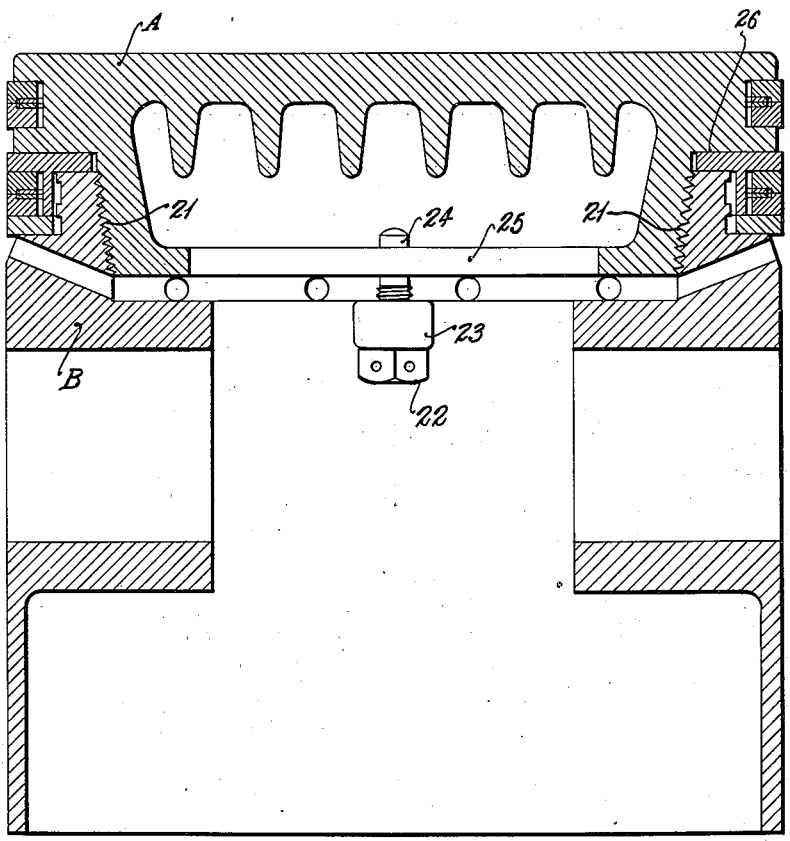
Fig. 11 is a longitudinal section through a piston provided with a piston-ring packing arrangement according to my invention.

In a piston body 13 there is inserted an unsplit ring 1 of substantially T-shaped section, the flange 1a of which ring engages a relatively deep groove 8 cut into the piston body 13. The web 1b of the ring 1 extends parallelly to the bottom of the piston ring groove and rests upon a flat ring 7 which may slide radially into a groove 12. Between the inner flat faces of the rings 1 and 7 there are lodged two piston rings 2 and 6 having arranged between them two axially expanding resilient washers 4, which tend to drive the piston rings apart and to press them against the unsplit rings.

The T-shaped ring 1 has its web 1b provided with a port 10 adapted to be engaged by a nose of a spring 5, one end of the said spring engaging a cavity 17 in the piston body 13 by means of a hook 18, while the other end of the spring bears freely against the bottom of the piston ring groove (Fig. 8).

The flat unsplit ring 7 is subjected to the pressure of a spring 14 which, by means of a nose 19, engages a recess 20 in the ring 7. One end of the spring 14 engages a further cavity 17 in the piston body by means of a hook 18, while the other end of the spring 14 bears freely against the bottom of the ring groove (Fig. 8).

The piston rings 2 and 6 are subjected to the pressure of springs 3 and 15 respectively, interposed between the bottom of the channel 9 and said rings. Springs 3 and 15, through their respective noses, engage recesses provided in the proximity of the slits in the piston rings, said noses preventing relative displacement between the piston rings and the springs. One end of each of the springs 3, 15 engages, through a hook, the web 1b of the unsplit ring 1, so that angular shift between the rings 1, 2, 6 and 7 is prevented. Furthermore the action of the various springs is exerted so as to make up for the wear on the cylinder walls. The slits 16 in the piston rings 2 and 6 are so arranged as to lie on opposite sides of the piston. The springs acting upon one of the unsplit rings and its adjacent split ring and the springs acting upon the other unsplit ring and its adjacent split ring are arranged in such a manner that each split ring and adjacent unsplit ring are always pushed outwards in diametrically opposed directions perpendicular to the piston pin so that the split of each piston ring is always covered by its adjacent unsplit ring.

The resilient washers 4, when in the expanded condition, have the shape shown in Fig. 7, and are made from thin steel plate. They are arranged in annular recesses cut into adjacent faces of the piston rings 2 and 6 and tend to drive the latter asunder axially and to press them against the rings 1 and 7 respectively, with the result that the piston rings 2 and 6 are urged firmly against the rings 1 and 7 and in turn urge the two latter rings into close contact with the upper and lower walls of the piston ring groove in the cylinder body 13. The unsplit resilient washers 4 then serve to some extent as an additional packing between the piston rings 2 and 6.

Considering that the rings 1 and 7 as well as the resilient washers 4 are unsplit, it is necessary to make the piston body 13 in two parts in order to enable the rings 1 and 7 and the washers 4 to be placed in position. To this purpose a conically threaded portion 21 of the piston head A is screwed into a correspondingly tapped portion of the piston body B, whereby to ensure a tight and firm connection between the parts A and B of the piston. In order to prevent unwanted separation of the parts A and B, there is provided a screw 22 screwed into an eye 23 on the part B and having a pin 24 adapted to enter a bore hole in a flange 25 on the part A.

The groove intended to receive the rings 1 and 7 is formed in the part B. The surface 26 of the piston head A comes to rest upon the upper side of the flange 1a of the ring 1.

It may be desirable to provide the piston head A with two additional piston rings similar to the rings 2 and 6.

Owing to the two-part construction of the piston, the piston head A may be made from a metal of a low coefficient of thermal expansion or of good heat conductivity, so that the expansion of A and B along the thread 21 will be of approximately the same value, regardless the fact that the piston head is subjected to a higher temperature than the piston body.

Moreover, since the unsplit rings 1 and 7 have—and should have—no proper elasticity, they may be made from a metal of high thermal conductivity, for example aluminum, preferably from forged aluminum, so that the edges of the said unsplit rings, which are in contact with the cylinder walls will obviously secure an efficient abstraction of the heat from the piston.

What I claim is:

1. In a piston packing arrangement: a piston having an annular groove therein; an unsplit profile section ring; an unsplit flat section ring in contact with the latter to define therewith a channel; said rings being mounted for sliding with relative radial play in the said groove; two piston rings for sliding with radial play in said channel; a slit in each of the piston rings, the slit in one piston ring being diametrically opposed to the slit in the other piston ring; annular recesses in the adjacent faces of the piston rings; two frusto-conical washers in mutual contact at their smaller base lodged in the said recesses; resilient means interposed between the bottom of said channel and each of the piston rings for forcing the latter radially in mutually opposite direction; resilient means interposed between the bottom of the groove in the piston and each of the two unsplit rings for forcing the latter radially in opposite directions for covering the slit region of each piston ring by the adjacent unsplit ring; means for securing said unsplit rings and said piston rings in angular position relative to the piston; and means associated with the piston for fitting the unsplit rings in the piston groove.

2. A piston packing arrangement as claimed in claim 1, characterised by the fact that the resilient means interposed between the channel and each of the piston rings comprise: an arcuate spring for each piston ring; an outwardly bent portion towards the middle of each spring; a notch in the internal face of each piston ring near the slit region thereof for receiving the outwardly bent portion of the respective spring; two diametrically opposed cuts in the bottom of the channel; and a hook formed on the end of each spring for engaging each of the said cuts.

3. A piston packing arrangement as claimed in claim 1, characterised in that the elastic means interposed between the bottom of the piston groove and the unsplit rings of the channel determining member comprise: a recess on the inner face of that portion of each of the unsplit rings which is situated in the proximity of the split region of the adjacent piston ring; an arcuate spring interposed between each unsplit ring and the bottom of the groove in the piston; a nose formed on the exterior of the central portion of each spring for engaging the said recesses; a hook formed on one end of each spring; and cavities formed in determined points in the bottom of the piston groove for receiving the said hooks.

4. In a piston packing arrangement, a piston having an annular groove therein, an annular relatively deep recess in the bottom of said groove, a substantially T-shaped section unsplit ring moving with radial play in said groove, the interior flange of said ring being radially guided in said recess, an unsplit flat section ring to slide radially in said groove, the shank of the said T-shaped ring extending parallel to the bottom of said groove and resting upon said flat ring, a channel being formed between the exterior flange and the web of said T-shaped ring and said flat ring, two piston rings for sliding with radial play in said channel, a split in each of the piston rings, the split in one piston ring being diametrically opposed to the split in the other piston ring, resilient means interposed between the bottom of the channel and each of the piston rings for forcing the latter in mutually opposite directions, resilient means interposed between the bottom of the groove in the piston and each of the two unsplit rings for forcing the latter bodily in diametrically opposite directions, each unsplit ring being urged in a direction to cover the split region of the adjacent split ring, means for securing said unsplit rings and said piston rings in fixed angular position relative to the piston, and means associated with the piston for fitting the unsplit rings in the piston groove.

LOUIS SOBRINO GUARDIOLA.